United States Patent [19]
Okajima et al.

[11] Patent Number: 5,761,592
[45] Date of Patent: Jun. 2, 1998

[54] PROCESS FOR PRODUCING A SLIDING MEMBER AND A PROCESS FOR PRODUCING A COMPOSITE LAYER MEMBER

[75] Inventors: Hiroshi Okajima; Akira Manabe, both of Aichi-ken, Japan

[73] Assignee: Toyota Jidosha Kabushiki Kaisha, Aichi-ken, Japan

[21] Appl. No.: 650,352

[22] Filed: May 20, 1996

[30] Foreign Application Priority Data

May 19, 1995 [JP] Japan ................................. 7-121696

[51] Int. Cl.⁶ ............................................... B22F 7/04
[52] U.S. Cl. ........................... 419/9; 419/8; 419/27; 419/45
[58] Field of Search ............................. 419/5, 8, 9, 45, 419/27

[56] References Cited

U.S. PATENT DOCUMENTS

| 4,037,522 | 7/1977 | Inoshita et al. |
| 4,505,987 | 3/1985 | Yamada et al. |

FOREIGN PATENT DOCUMENTS

| A-3744573 | 7/1988 | Germany |
| 56-116803 | 9/1981 | Japan |
| 58-3902 | 1/1983 | Japan |
| 60-39105 | 2/1985 | Japan |
| 61-96010 | 5/1986 | Japan |
| 63-130705 | 6/1988 | Japan |
| 64-56851 | 3/1989 | Japan |
| 1-95894 | 4/1989 | Japan |

OTHER PUBLICATIONS

"Soviet Powder Metallurgy and Metal Ceramics", V.N. Eremenko et al., vol. 12, No. 7, Jul. 1973, pp. 565-568.
European Search Report dated Sep. 11, 1996 (2 pages).
Communication dated Sep. 24, 1996 (1 page).
Statement of Relevancy (1 page).

*Primary Examiner*—Daniel J. Jenkins
*Attorney, Agent, or Firm*—Finnegan, Henderson, Farabow, Garrett & Dunner, L.L.P.

[57] ABSTRACT

A process for producing a sliding member employs a base material having a covering surface and pores, and a layer material comprising a constitutive component for reacting with a constitutive component of the base material. Initially, the layer material comes into contact with at least part of the covering surface of the base material. Next, the both are heated to the sintering temperature of the base material. Thus, a molten liquid occurs at the boundary between the base material and the layer material. Since the solidus temperature of the molten liquid increases with the reaction proceeding, the molten liquid can solidify early to seal the pores at the covering surface of the base material early. Therefore, the layer material remains on the covering surface of the base material, the remaining layer material comes to constitute a sliding surface.

35 Claims, 7 Drawing Sheets

500 μm

500 μm

500 μm

PROCESS FOR PRODUCING A SLIDING MEMBER AND A PROCESS FOR PRODUCING A COMPOSITE LAYER MEMBER

BACKGROUND OF THE INVENTION

1. Field of the Invention

The present invention relates to a process for producing a sliding member and a process for producing a composite layer member. They are applicable to sliding articles, such as synchronizer-rings, cams, rocker-arms, tappets, and the like.

2. Description of the Related Art

Conventionally, various processes have been proposed for improving bonding strength of composite layer members.

Japanese Unexamined Patent Publication (KOKAI) No.61-96010 discloses a process in which a powder alloy sheet is bonded to an iron member in use of molten liquid. This process employs the iron member such as cast iron, and the powder alloy sheet has resin and eutectic alloy powders comprising C and Mo. In this process, initially, the powder alloy sheet is put on a covering surface of the iron member, secondarily, they are heated so that molten liquid may occur at the boundary between the covering-surface of the iron member and the powder alloy sheet. After the molten liquid occurs, the molten liquid is promptly cooled to solidify by positive cooling treatment, and thereby the melting point of the solidified portion is higher. Next, the powder alloy sheet is essentially sintered by liquid-phase sintering. According to this conventional process, metallurgical bonding can be obtained by use of the solidification of the molten liquid, and the bonding strength can be improved.

Further, Japanese Unexamined Patent Publication (KOKAI) No.63-130705 discloses another process for a frictional bonding member such as a transmission. This process employs a synchronizer-ring having a cone-shaped inner circumferential surface. In this process, initially, dies are closed on condition that these two layers are piled on the cone-shaped inner circumferential surface of the synchronizer-ring. Secondarily, these two layers are sintered with the dies closed. And then, compressive force is generated by a thermal expansion of these two layers during the sintering, and thereby bonding strength of the two layers is improved by using the compressive force.

Besides, Japanese Unexamined Patent Publication (KOKAI) No.58-3902 discloses another process for producing a cam shaft having good bonding strength. This process employs a presintered body composed of sintered material having a sintering-contraction rate of 2% and more. On condition that the presintered body is installed at an outer circumferential surface of the cam shaft, the pre-sintered body is sintered, and thereby bonding strength of the cam shaft is improved by shrinkage force owing to sintering and liquid-bonding.

Moreover, Japanese Unexamined Patent Publication (KOKAI) No.64-56851 discloses another process for producing a sintered alloy having heat-resistance and abrasion-resistance. This process employs iron based powders and copper based infiltrating powders comprising Pb and so on. This iron based powders comprise C, Cr, Si, Mn, B, Zr, Hf, and so on. In this process, a two-layer green compact is formed by pressing the iron based powders and the copper based infiltrating powders in two-layers. And also, the iron based powder portions out of the two-layer green compact are sintered. Thus, molten liquid occurs, and infiltrates into pores of the two-layer green compact positively.

According to each of techniques disclosed by the above-mentioned Japanese Unexamined Patent Publications, since the bonding strength is not satisfactory, there are necessities for improvement.

Furthermore, the applicant of the present invention has been recently developed a solder-bonding technique disclosed as Japanese Unexamined Patent Publication (KOKAI) No.1-95894. In this technique, a solder material, which is belonging to copper based alloy, exists at a boundary between these two iron green compacts, the solder material is heated to bond these two iron green compacts. The composition of the solder material includes from 15 to 30% Ni, from 5 to 15% Mn, from 0.5 to 3% Si, from 0.5 to 1.5% B, and the balance substantially of iron by weight.

By the way, in the case of infiltration, providing that infiltrating material is kept iso-thermally in molten liquid, the infiltrating material comes to infiltrate into pores of a base material excessively, so that a layer material is hard to remain on a covering surface of the base material.

In the case where all the layer material infiltrates into the pores of the base material, the infiltrating material can not remain substantially on the covering surface of the base material. Further, since an infiltration amount to the pores of the base material is too large, the base material has a tendency to expand, so that dimensional precision of the base material is easy to deteriorate, and deformation of the base material is easy to generate.

As a result, it is necessary that cooling treatment for solidifying the molten liquid is performed positively after the infiltration. In this case, the infiltrating material can remain on the base material. In this way, the molten infiltrating material is solidified compulsively by the positive cooling treatment in the conventional techniques.

Also, the above-mentioned technique shown in Japanese Unexamined Patent Publication (KOKAI) No.61-96010, after the molten liquid occurs at the boundary between the covering surface of the iron member and the powder alloy sheet, the cooling treatment to solidify the molten liquid is performed positively.

However, it is not inadequate as industrial technology that the positive cooling treatment is performed after the molten liquid occurs at the boundary between the covering the iron member and the powder alloy sheet. For instance, the performing of the positive cooling treatment is disadvantageous in employing a continuously sintering process where sintering temperature is fixed.

According to the above-mentioned alloy shown in Japanese Unexamined Patent Publication (KOKAI) No.1-95894, these two iron green compacts are bonded in a body with the solder material; however, this publication technique does not intend to obtain a sliding member which is exposed outside in uses and which requires good sliding-resistance.

SUMMARY OF THE INVENTION

The present invention has been developed in view of the above circumstances. It is an object of the present invention to provide a process for producing a sliding member in which solidification of molten liquid is accelerated by the increasing of solidus temperature of occurring molten liquid, and thereby sealing of pores formed at a covering surface of a base material can be accomplished early.

It is another object of the present invention to provide a process for producing a sliding member in which it is suppressed that molten liquid resulting from a layer material infiltrates into a base material excessively. Further, it is another object of the present invention to provide a process for producing a sliding member in which a layer material for constituting a sliding surface can remain advantageously, and in which sliding capacity of the sliding member is enhanced advantageously.

It is an object to provide a process for producing a composite layer member in which molten liquid flows downward by arranging a covering surface of a base material vertically, and in which evenness and thinness of a solidified layer can be accomplished advantageously.

The inventors of the present invention have developed for the above-mentioned objects and conceived as follows: there are material having a property in which solidus temperature of molten liquid increases with a reaction proceeding. Providing that the material having such property is employed, the above-mentioned objects are advantageously accomplished. The inventors have conceived and ascertained such function and effect in tests.

The principle mechanism of the present invention is guessed as follows: The principle mechanism will be hereinafter described with reference to an example shown in FIG. 20(A). The composition of a base material is set at "a", and the composition of a layer material is set at "b" in FIG. 20(A). As the composition value, which is indicated as the horizontal axis in FIG. 20(A), goes in a direction of the arrow "X1" in FIG. 20(A), the concentration of "a" is higher and higher. On the contrary, as the composition value goes in a direction of the arrow "X2" in FIG. 20(A), the concentration of "a" is lower and lower.

On condition that a material having the composition of "b" comes into contact with a layer material, heat treatment is carried out in order that temperature may increase from "T" to "T3" (the target sintering temperature of the base material) in FIG. 20(A). According to FIG. 20(A), when temperature reaches the solidus temperature of "T2" from the temperature of "T1" during the heat treatment, molten liquid begins to occur from the metal having the composition of "b". With respect to the solidus temperature of "T2", since the composition of the molten liquid is indicated as "L1" in the liquidus temperature curve, the concentration of metal "a" in the molten liquid is lower.

However, since the base material comes into contact with the layer material, diffusion progresses early between the base material having the composition of "a" in FIG. 20(A) and the molten liquid. Thus, the concentration of "a" in the molten liquid increases gradually in a direction of the arrow "X1".

This means that the solidus temperature in the equilibrium diagram increases with the reaction of the metal and the molten liquid.

Consequently, in spite of the fact that the positive cooling treatment is not carried out, namely, in spite of the fact that the temperature of "T3" is kept or fixed iso-thermally, the molten liquid can solidify.

It is guessed that the reaction of the base material and the layer material is easy to progress exceedingly at the boundary of the both material owing to diffusion-reaction. According to the above-mentioned mechanism, the solidus temperature of the molten liquid can increase, and the molten liquid is easy to generate at the boundary.

When the layer material is not only in an all-molten stage but also in a solid-liquid coexistent stage, the above-mentioned mechanism can be obtained.

A process for producing a sliding member according to the present invention employs:

a base material having a covering surface and pores formed at least in the covering surface, and a layer material comprising a constitutive component for reacting with a constitutive component of the base material, the constitutive component of the layer material having a property being capable of occurring molten liquid whose solidus temperature increases with a reaction proceeding; and the process comprises the steps of:

a contacting step of bringing the layer material into contact with at least part of the covering surface of the base material, and a heating step of heating the base material and the layer material to the temperature range being capable of occurring the molten liquid, reacting the constitutive component of the base material with the constitutive component of the layer material, occurring the molten liquid whose solidus temperature increases with the reaction proceeding, infiltrating the molten liquid into the pores of the covering surface of the base material, solidifying the molten liquid with the solidus temperature increasing, and thereby sealing the pores at the covering surface of the base material early, wherein the layer material remains at the covering surface of the base material, the remaining layer material comes to constitute a sliding surface.

A process for producing a composite layer member according to the present invention employs:

a base material having a covering surface arranged nearly vertically and pores formed at least at the covering surface, and a layer material comprising a constitutive component for reacting with a constitutive component of the base material, the constitutive component of the layer material having a property being capable of occurring molten liquid whose solidus temperature increases with a reaction proceeding; and the process comprises the steps of:

a contacting step of bringing the layer material into contact with at least part of the covering surface of the base material, and a heating step of heating the base material and the layer material to the temperature range being capable of occurring the molten liquid, reacting the constitutive component of the base material with the constitutive component of the layer material, occurring the molten liquid whose solidus temperature increases with the reaction proceeding, so that the molten liquid flows downward along the covering surface of the base material, and solidifying the molten liquid with the increasing solidus temperature.

In present invention, the word of "a layer material" means a material for covering at least part of the covering surface of the base material.

According to the present invention, since the layer material is heated in the temperature range occurring the molten liquid, the constitutive component of the base material reacts with the constitutive component of the layer material; therefore, the molten liquid occurs. The solidus temperature of the molten liquid increases with the reaction proceeding. In this way, the solidus temperature of the molten liquid increases gradually. In spite of the fact that the layer material is kept or fixed iso-thermally, the molten liquidus can solidify early.

According to the present invention, it is thought that the above-mentioned reaction is easy to proceed at the boundary between the base material and the layer material; therefore, it is thought the molten liquid is easy to solidify at the boundary.

Since the occurred molten liquid solidifies early with the solidus temperature increasing, the pores formed at the covering surface of the base material can be sealed early.

This early solidification of the molten liquid prevents the molten liquid from infiltrating into the base material excessively. Thus, the process of the present invention can contribute to secure the dimensional precision of the base material and to prevent deformation of the base material.

Further, since the early solidification of the molten liquid prevents the molten liquid from infiltrating into the base material excessively, the layer material constituting the sliding surface can be easy to remain on the covering surface of the base material. And then, since the layer material undergoes the all-molten stage or the solid-liquid coexistent stage, flatness of the layer material can be enhanced, thereby advantageously improving the flatness of the exposed surface of the layer material constituting a sliding surface.

Additionally, in the case where the composition of the layer material is adjusted to a composition of the sliding member, a sliding surface can be constituted simultaneously with sintering of the base material.

According to the present invention, in the case where the covering surface is arranged vertically, the occurring molten liquid is easy to flow downward. The word of "vertically" means a molten liquid's flowing direction. Namely, the word of "vertically" includes the plumb-line, and a direction leaning with respect to the plumb-line. In the present invention, the occurred molten liquid flows downward along the covering surface due to gravity.

Since the molten liquid portion being directly in contact with the covering surface of the base material is easy to react with the constitutive component of the base material, the solidus temperature is easy to increase early. Accordingly, even when the temperature is iso-thermally fixed at a predetermined temperature, the solidus temperature of the molten liquid can increase naturally. So, the molten liquid portion being directly in contact with the covering surface of the base material can solidify early. However, the molten liquid which is not directly in contact with the covering surface is easy to delay in the reaction. Thus, the increasing of the solidus temperature is delayed, so the molten liquid can flow farther downward. Providing that the molten liquid comes into contact with the covering surface of the base material, the reaction is enhanced due to diffusion. Thus, the solidus temperature increases, the molten liquid can solidify early. Accordingly, it is advantageous in averaging and thinning the thickness of the solidified layer which can be employed as a sliding layer.

BRIEF DESCRIPTION OF THE DRAWINGS

A more complete appreciation of the present invention and many of its advantages will be readily obtained by reference to the following detailed description with the accompanying drawings and detailed specification, wherein.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The preferred embodiments according to the present invention will be hereinafter described with the figures.

First Preferred Embodiment

Figure 1:
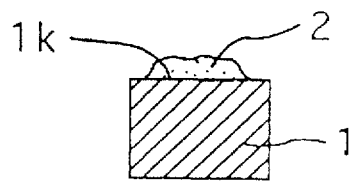
FIG. 1 is a construction view which schematically illustrates a producing step of a First Preferred Embodiment according to the present invention.

FIG. 1 schematically shows the First Embodiment. This embodiment employs a base material 1 and a layer material 2. The base material 1 is made of a green compact composed by pressing metallic first raw material powders. The layer material 2 is constituted by gathering metallic second raw material powders. A compressive force to form the base material 1 can be properly selected depending on the circumstances. For instance, a compressive force of 640 MPa can be selected. A density ratio of the base material 1 can be properly selected, for instance, it can be selected in the vicinity of from 80% to 95%. Therefore, opened pores exist in the base material 1.

In this embodiment, initially, a proper amount of the powder-like layer material 2 is put on a covering surface 1k disposed at an upper side of the base material 1. In this arrangement, the both are heated to the vicinity of a target temperature, a sintering temperature of the base material 1. And then, the both are kept in the vicinity of the target temperature, and thereby the base material 1 is sintered to become a sintered metal. Sintering time can be properly selected, for instance, it can be in the vicinity of 15 to 30 minutes. As for the sintering atmosphere, a non-atmosphere is preferable, for instance, a nitrogen atmosphere is preferable. In the range of the sintering temperature, the layer material 2 comes to be either an all-molten stage or a solid-liquid coexistent stage.

In the case of the sintering, since a metallic constitutive component of the base material 1 reacts with a metallic constitutive component of the layer material 2 at the boundary between the both, molten liquid occurs at the boundary. Therefore, the solidus temperature of the occurred molten liquid increases as mentioned above. Thus, even when the temperature is kept or fixed iso-thermally in the range of sintering temperature, namely, without positive cooling-treatment, the molten liquid positioned at the side of the covering surface 1k can solidify at the boundary between the both. Thus, the pores, which are positioned at the side of the covering surface 1k of the base material 1, are sealed early by solidification of the molten liquid.

In this way, since the pores positioned at the side of covering surface 1k out of the base material 1 are sealed early, the greater part of the molten liquid can remain on the covering surface of the layer material 2. Accordingly, it is avantageously prevented that almost all of the molten liquid infiltrates into the pores of the base material 1 excessively. Thus, the layer material 2, which constitutes a sliding surface, remains advantageously on the covering surface 1k of the base material 1.

Moreover, since the layer material 2 experiences the all-molten stage or the solid-liquid coexistent stage during the sintering step, the flatness of the upper surface of the layer material 2 is improved. Thus, it is advantageous to employ the upper surface of the remaining solid body, namely, to employ the upper surface of the layer material 2 as a sliding surface requiring good-flatness.

With regard to these circumstances, it is preferable that the composition of the layer material 2 is set to be suitable for a sliding material. In the case where the layer material 2 before the sintering is the gathering powders, it is advantageous to change the amount of the layer material 2 and the covering location of the layer material 2.

Second Preferred Embodiment

Figure 2:
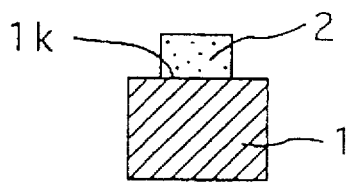
FIG. 2 is a construction view which schematically illustrates a producing step of a Second Preferred Embodiment a according to the present invention.

FIG. 2 schematically shows the Second Preferred Embodiment which is similar in construction to the First Preferred Embodiment.

This embodiment employs a base material 1 and a layer material 2. The base material 1 is made of a green compact composed by pressing metallic first raw material powders. The layer material 2 is constituted by gathering metallic second raw material powders.

Initially, the layer material 2 is put on the covering surface 1k disposed at an upper side of the base material 1. In this arrangement, the both are heated to the vicinity of the target temperature, sintering temperature. The both are kept in the vicinity of the target temperature, thereby the base material 1 is sintered to become a sintered metal. The layer material 2 experiences the all-molten stage or the solid-liquid coexistent stage during the sintering step.

In the case of the sintering step, since the metallic constitutive component of the base material 1 reacts with the metallic constitutive component of the layer material 2 at the boundary of the both. So, molten liquid occurs at the boundary of the both, and the solidus temperature of the occurred molten liquid increases as mentioned above. Therefore, even when the temperature is fixed iso-thermally in the range of sintering temperature, the molten liquid can solidify automatically. Thus, the pores, which are positioned at the side of the covering surface 1k of the base material 1, can be sealed early.

The Second Preferred Embodiment is basically similar in functions and effects to the First Preferred Embodiment.

In the case where the layer material 2 is the solid-shaped green compact, it is advantageous to average the amount of the layer material 2 and to prevent the amount of the layer material from scattering.

Third Preferred Embodiment

Figure 3:
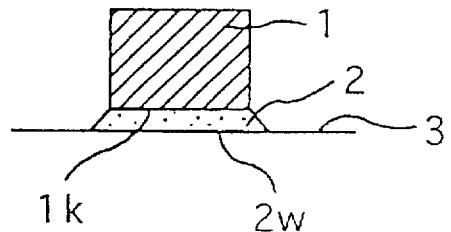
FIG. 3 is a construction view which schematically illustrates a producing step of a Third Preferred Embodiment according to the present invention.

FIG. 3 schematically shows the Third Preferred Embodiment which is similar in construction to the First Preferred Embodiment.

This embodiment employs a base material 1, a layer material 2, and a tray 3 which works as a putting member. A surface of the tray 3 is flat. The base material 1 is made of a green compact composed by pressing metallic first raw material powders. The layer material 2 is constituted by gathering metallic second raw material powders.

Initially, the layer material 2, which is constituted by gathering the metallic second raw material powders, is put on the tray 3. Next, a covering surface 1k of the base material 1 is put on the layer material 2. In this arrangement, both the base material 1 and the layer material 2 are heated to the vicinity of the target temperature, sintering temperature. The both are kept in the vicinity of the target temperature, thereby the base material 1 is sintered to become a sintered metal. In the sintering, the layer material 2 becomes either an all-molten stage or a solid-liquid coexistent stage. In this embodiment, owing to the fact that weight of the base material 1 affects the molten liquid, the molten liquid of the layer material 2 is pressed to the tray 3.

When the base material 1 and the layer material 2 are cooled after sintering, the molten layer material 2 solidifies in this condition. Therefore, a surface 2w of the layer material 2, which faces to the surface of the tray 3, can be corrected honestly. So, it is advantageous to diminish surface-roughness of the surface 2w constituting a sliding surface.

Also in this embodiment, the molten liquid occurs at the boundary of the base material 1 and layer material 2. Since the solidus temperature of the molten liquid increases gradually, the pores of the base material 1 can be sealed early. Thus, this embodiment is basically similar in functions and effects to the First Preferred Embodiment.

And then, the base material 1 is disposed on the layer material 2 as shown in FIG. 3, it is advantageous to prevent the molten liquid from infiltrating into the base material 1 due to surface tension. In this point, over-infiltration into the base material 1 can be prevented.

According to tests practiced by the inventors of the present invention, in the case where an upper surface of the layer material 2 is set to be a free-surface as shown in FIG. 1, surface-roughness "Rmax" exhibited a large value, approximately 193 micrometers. This is probably the reason why dendrite crystals grow during solidification.

On the other hand, in the case where the weight of the base material 1 affects the molten liquid, the surface-roughness "Rmax" exhibited a small value, approximately 85 micrometers.

Fourth Preferred Embodiment

Figure 4:
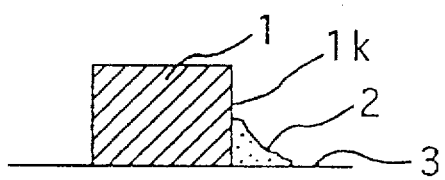
FIG. 4 is a construction view which schematically illustrates a producing step of a Fourth Preferred Embodiment according to the present invention.

FIG. 4 schematically shows the Fourth Preferred Embodiment which is similar in construction to the First Preferred Embodiment.

This embodiment employs a base material 1 whose covering surface 1k extends nearly vertically, a layer material 2, and a tray 3. The covering surface 1k is a side surface of the base material 1. The base material 1 is made of a green compact composed by pressing metallic first raw material powders. The layer material 2 is constituted by gathering metallic second raw material powders.

The layer material 2 comes into contact with a covering surface 1k of the base material 1 on the tray 3. In this arrangement, both the base material 1 and the layer material 2 are heated and kept in the sintering temperature so as to sinter the base material 1. In this embodiment, owing to the fact that the solidus temperature of molten liquid can increase, the molten liquid can solidify early, and the pores of the covering surface 1k of the base material 1 can be sealed early. Thus, this embodiment is basically similar in functions and effects to the First Preferred Embodiment.

Fifth Preferred Embodiment

Figure 5:
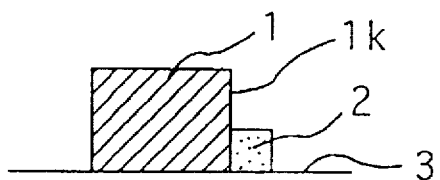
FIG. 5 is a construction view which schematically illustrates a producing step of a Fifth Preferred Embodiment according to the present invention.

FIG. 5 schematically shows the Fifth Preferred Embodiment which is similar in construction to the Fourth Preferred Embodiment.

This embodiment employs a base material 1 whose covering surface 1k extends vertically, a layer material 2, and a tray 3. The base material is made of a green compact composed by pressing metallic first raw material powders. The layer material 2 is made of another green compact composed by pressing second metallic raw material powders. The covering surface 1k is a side surface of the base material 1, and extends nearly vertically.

Initially, the layer material 2, which is made of t he green compact, comes into contact with the covering surface 1k on the tray 3. In this arrangement, both the base material 1 and the layer material 2 are heated and kept in the sintering temperature so as to sinter the base material 1. In this embodiment, owing to the fact that the solidus temperature of molten liquid can increase, the molten liquid can solidify early, the pores of the base material 1 can be sealed early. Thus, this embodiment is basically similar in functions and effects to the First Preferred Embodiment.

Sixth Preferred Embodiment

Figure 6:
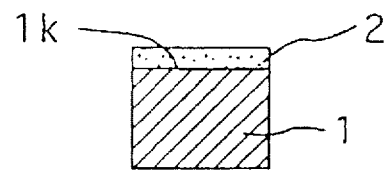
FIG. 6 is a construction view which schematically illustrates a producing step of a Sixth Preferred Embodiment according to the present invention.

FIG. 6 schematically shows the Sixth Preferred Embodiment which is similar in construction to the Second Preferred Embodiment.

In this embodiment, in order to form a green compact, first raw material powders for constituting a base material 1 are inserted into a bottom of a cavity of forming-dies. Next, second raw material powders for constituting a layer material 2 are overlapped on the first raw material powders. Compressive forming is carried out in this arrangement, so a two-layer constructional green compact is integrally obtained. After that, the two-layer constructional green compact is heated and kept in the sintering temperature for sintering. In this embodiment, owing to the fact that the solidus temperature of molten liquid can increase, the molten liquid can solidify early, the pores of the base material 1 can be sealed early. Thus, this embodiment is basically similar in functions and effects to the First Preferred Embodiment.

Seventh Preferred Embodiment

Figure 7:
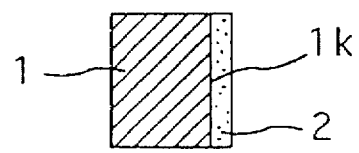
FIG. 7 is a construction view which schematically illustrates a producing step of a Seventh Preferred Embodiment according to the present invention.

FIG. 7 schematically shows the Seventh Preferred Embodiment which is similar in construction to the Sixth Preferred Embodiment.

In this embodiment, before sintering, a covering surface 1k of a base material 1 and a layer material 2 are turned to be arranged nearly vertically. The base material 1 and the layer material 2 constitute a two-layer constructional green compact. In this arrangement, the two-layer constructional green compact is heated and kept in the sintering temperature for sintering.

In this embodiment, owing to the fact that the solidus temperature of molten liquid can increase, the molten liquid can solidify early, and the pores of the base material 1 can be sealed early. Thus, this embodiment is basically similar in functions and effects to the First Preferred Embodiment.

Eight Preferred Embodiment

Figure 8:
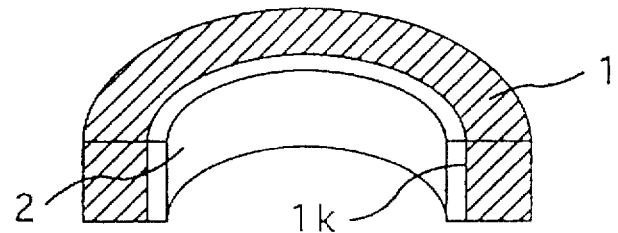
FIG. 8 is a construction view which schematically illustrates a producing step of an Eighth Preferred Embodiment according to the present invention.

FIG. 8 schematically shows the Eighth Preferred Embodiment which is similar in construction to the Seventh Preferred Embodiment.

In this embodiment, first raw material powders and second raw material powders are pressed coaxially by compressive-forming, so that a layer material 2 and a base material 1 are formed in a body to constitute a ring-shaped green compact.

The ring-shaped green compact has a configuration including an inner layer and an outer layer, namely, a two-layer configuration. In this arrangement, the two-layer green compact is heated and kept in the sintering temperature for sintering.

In this embodiment, the layer material 2 is disposed at the inner circumferential portion of the ring-shaped green compact.

However, the layer material 2 can be disposed at an outer circumferential portion with uses instead of the inner circumferential portion.

Possibly, the layer material 2 can be disposed both at the inner circumferential portion of the base material 1 and at the inner circumferential portion with uses.

In this embodiment, when the molten liquid occurs, the solidus temperature of the molten liquid can increase, so the molten liquid can solidify early. Therefore, the pores of the base material 1 can be sealed early. Thus, this embodiment is basically similar in functions and effects to the First Preferred Embodiment. In this embodiment, since the covering surface 1k of the base material 1 is arranged nearly vertically, the occurred molten liquid can flow downward with the molten liquid solidifying.

Ninth Preferred Embodiment

Figure 9:
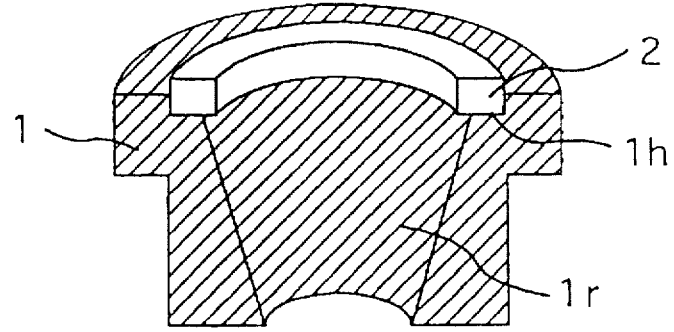
FIG. 9 is a construction view which schematically illustrates a producing step of a Ninth Preferred Embodiment according to the present invention.

FIG. 9 schematically shows the Ninth Preferred Embodiment which is similar in construction to the Eight Preferred Embodiment.

In this embodiment, a green compact is composed by pressing raw material powders, thereby a ring-shaped base material 1 is constituted. An inner circumferential surface 1r, which works as a covering surface of the base material 1, is a conical-surface, whose inner diameter is decreasing as it goes downward. An engaging concave portion 1h is formed at an upper portion of the inner circumferential surface 1r.

Initially, a layer material 2, which is constituted by another ring-shaped green compact composed by pressing second raw material powders, is engaged with the engaging concave portion 1h to be held on the base material 1.

Next, the both are heated to the target temperature, and both are kept in the sintering temperature for sintering the base material 1. As a result, the layer material 2 is molten, the molten liquid flows downward along the inner circumferential surface 1r of the base material. Consequently, the flowing molten liquid reacts with the constitutive component of the inner circumferential surface 1r of the base material 1; therefore, the solidus temperature of the molten liquid can increase, and the flowing molten liquid can solidify.

Thus, even when the layer material 2 is kept iso-thermally in this embodiment, the molten liquid can solidify, so the pores of the base material 1 can be sealed early. Therefore, this embodiment is basically similar in functions and effects to the First Preferred Embodiment.

Tenth Preferred Embodiment

Figure 10:
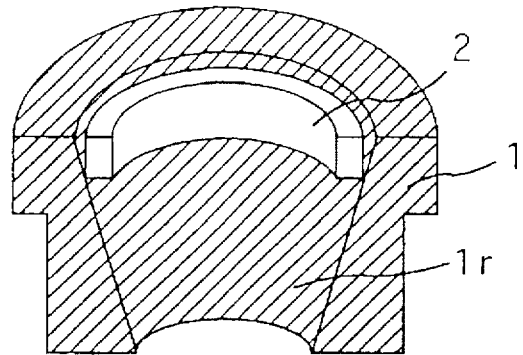
FIG. 10 is a construction view which schematically illustrates a producing step of a Tenth Preferred Embodiment according to the present invention.

FIG. 10 schematically shows the Tenth Preferred Embodiment which is similar in construction to the Ninth Preferred Embodiment.

In this embodiment, a base material 1 has an inner circumferential surface 1r having a ring-shape. The inner circumferential surface 1r is a conical-surface, whose diameter is decreasing as it goes downward. Therefore, a ring-shaped layer material 2 can be engaged with the inner circumferential surface 1r. So, the engagement can prevents the layer material 2 from dropping.

In this embodiment, the molten liquid occurs, and flows downward along the inner circumferential surface 1r. Consequently, the flowing molten liquid reacts with the constitutive component of the inner circumferential surface 1r, the solidus temperature of the molten liquid can increase. So, the flowing molten liquid can solidify early. Thus, the molten liquid can solidify, and the pores of the base material 1 can be sealed early. Therefore, this embodiment is basically similar in functions and effects to the First Preferred Embodiment.

Eleventh Preferred Embodiment

Figure 11:
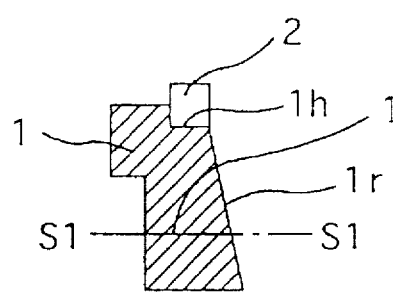
FIG. 11 is a construction view which schematically illustrates a producing step of an Eleventh Preferred Embodiment according to the present invention.
Figure 12:
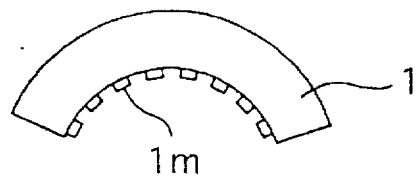
FIG. 12 is a cross-sectional view which schematically illustrates a major portion of the base material of the Eleventh Preferred Embodiment according to the present invention.

FIGS. 11 and 12 schematically show the Eleventh Preferred Embodiment which is similar in construction to the Ninth Preferred Embodiment. FIG. 12 shows a cross section being along "S1—S1" in FIG. 11. This embodiment employs a ring-shaped base-material 1, which is made of a green compact composed by pressing first raw material powders.

The base material 1 includes an inner circumferential surface 1r having a cone-shape, whose diameter is decreasing as it goes downward.

A ring-shaped layer material 2, which is mad e of another green compact composed by pressing second raw material powders, and which is engaged with an engaging concave portion 1h Therefore, the layer material 2 is held at the upper portion of the base material 1.

Furthermore, as can be seen in FIG. 12, concave-convex portions 1m are disposed at the inner circumferential surface 1r working as the covering surface of the base material 1. The concave-convex portions 1m contribute to increase a surface area of the inner circumferential surface 1r.

In this embodiment, the base material 1 is heated and kept in the sintering temperature for sintering the base material 1. In sintering, the layer material 2 becomes molten, the molten liquid flows downward along the inner circumferential surface 1r. Then, the flowing molten liquid reacts with the constitutive component of the base material 1 to form solidification layer.

In this embodiment, the solidus temperature of the molten liquid can increase, so the flowing molten liquid can solidify. Thus, the pores of the base material 1 can be sealed early. Therefore, this embodiment is basically similar in functions and effects to the First Preferred Embodiment.

In this embodiment, since the concave-convex portions 1m are disposed at the inner circumferential surface 1r of the base material 1, the reactive area between the inner circumferential surface 1r and the molten liquid increases. So, the reactive ability is improved. Accordingly, it is advantageous that the solidus temperature of the molten liquid can increase effectively and early.

Also, since the concave-convex portions 1m extend nearly vertically, the concave-convex portions 1m do not come to hinder the flowing molten liquid.

Twelfth Preferred Embodiment

Figure 13:
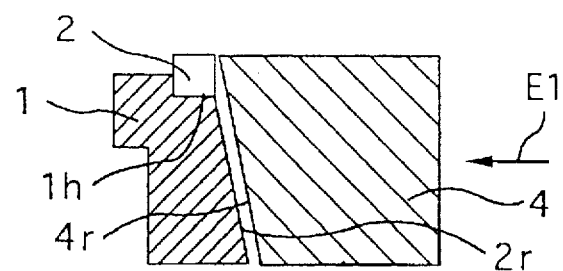
FIG. 13 is a construction view which schematically illustrates a producing step of a Twelfth Preferred Embodiment according to the present invention.

FIG. 13 schematically shows the Twelfth Preferred Embodiment which is similar in construction to the Ninth Preferred Embodiment.

This embodiment employs a base material 1 made of a green compact composed by pressing first raw material powders. And also, the embodiment employs a pressing jig 4 working as pressing means. The pressing jig 4 has an outer circumferential surface, namely, a pressing surface 4r whose inclination corresponds to a conical inner circumferential surface 1r of the base material 1.

Initially, a layer material 2, which is made of a green compact, is engaged with an engaging concave portion 1h of the base material 1. Next, the base material 1 and the layer material are heated and kept in the sintering temperature for sintering the base material 1. In the sintering, molten liquid occurs, and the molten liquid flows downward along the inner circumferential surface 1r.

When the molten liquid flows downward, providing that the pressing jig 4 moves to the inner circumferential surface 1r of the base material 1 in a direction of the arrow "E1", the pressing surface 4r of the pressing jig 4 can press the molten liquid to correct the configuration of the molten liquid.

Therefore, surface-roughness, dimensional precision in the solidification layer can be improved. The pressing jig 4 can be preferably made of material which is hard to react with the molten liquid. For instance, graphite or ceramics and so on can be preferably employed.

The Flow of the Molten Liquid

By the way, as described above, there are the embodiments where the covering surface 1k and the inner circumferential surface 1r of the base material 1 are arranged nearly vertically. The functions and effects of this case will be explained hereinafter with FIGS. 14(A) to 14(E) showing schematically the flowing configurations.

Figure 14A:
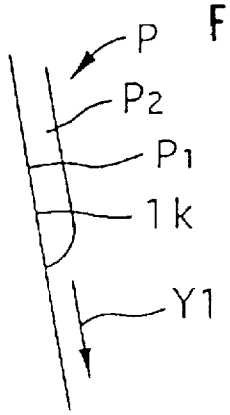
FIGS. 14 (A) to (E) show construction views which schematically illustrate producing steps for the molten liquid's flowing downward and for solidifying the solidified layer.
Figure 14B:
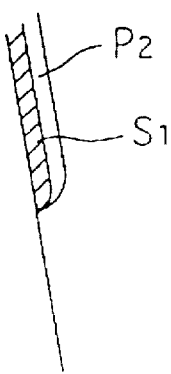

Since the layer material 2 is kept all-molten condition or solid-liquid coexistence, the molten liquid has a tendency to flow downward along the covering surface owing to gravity. FIG. 14(A) shows a configuration in which the molten liquid "P" flows downward in a direction of arrow "Y1" owing to the gravity. With respect to the flowing molten liquid "P", the molten portion "P1", which is directly in contact with the covering surface 1k, has a tendency to react with the base material 1, so that the solidus temperature of the molten portion "P1" increases promptly. Therefore, the molten portion "P1" being in contact with the covering surface 1k is transformed into a solidified layer "S1" shown in FIG. 4(B).

However, the molten portion "P2", which is not directly in contact with the covering surface 1k of the base material 1, delays in reaction (diffusion). Thus, the increasing of the solidus temperature of the molten portion "P2" delays, the molten portion "P2" does not solidify but flows farther downward as schematically shown in FIG. 14(C).

Figure 14C:
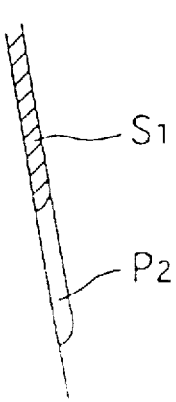

Furthermore, as can be seen in FIG. 14(C), providing that the molten portion "P2" comes into directly contact with the covering surface 1k, the reactive ability is improved to increase the solidus temperature of the molten portion "P2". Therefore, the molten portion "P2" solidifies early, and is transformed into a solidified layer "S2".

Figure 14D:
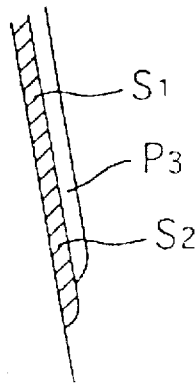
Figure 14E:
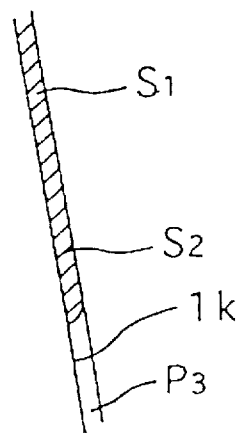

In sintering, since the layer material 2 is heated in sintering temperature of the base material 1 to melt continuously, as can be understood from FIG. 14(D), the molten portion "P3", which is melt from the layer material 2, flows farther downward. Since the molten portion "P3" shown in FIG. 14(D) is not directly in contact with the base material 1, the increasing of the solidus temperature in the molten portion "P3" delays, so the molten portion "P3" does not solidify but flows downward with molten. However, as shown in FIG. 14(E), in the case where the molten portion "P3" comes into directly contact with the covering surface 1k, the reactive ability is improved to increase the solidus temperature of the molten portion "P3". Therefore, the molten portion "P3" solidifies early, and is transformed into another solidified layer.

In such a manner, providing that the covering surface 1k is arranged nearly vertically, the solidified layer is easy to extend in a vertical direction, namely, an extending direction of the covering surface 1k of the base material. So, the solidified layer is easy to become thin and uniform. Thus, it is advantageous in averaging and thinning the thickness of the solidified layer which can work as a sliding layer.

In the embodiment where the boundary between the base material 1 and the layer material 2 are arranged nearly vertically, that is, in the case where the covering surface 1k including the inner circumferential surface 1r is arranged in the vertical direction, the above functions and effects are accomplished.

Therefore, the above functions and effects accomplished in the embodiment shown in FIG. 9, the embodiment shown in FIG. 10, and the embodiment shown in FIG. 11. Moreover, the embodiment shown in FIG. 8, the embodiment shown in FIG. 7, the embodiment shown in FIG. 4, and the embodiment shown in FIG. 5, are similar in averaging and thinning the thickness of the solidified layer.

Application Examples

The base material 1 can preferably be composed of iron-alloy in consideration of cost and strength. In consideration of the sintering temperature, it is preferable that the composition of the second raw material powders which constitute the layer material 2 is set to occur adequate molten liquid in sintering temperature.

In the case where the exposed surface of the layer material 2 is employed as a sliding surface, it is preferable that the composition of the second raw material powders is set in order to ensure sliding properties, such as abrasion-resistance, seizure-resistance and a good frictional-coefficient.

Considering these circumstances, as for the composition of the second raw material powders which constitute the layer material 2, copper(Cu) based alloys, such as copper-manganese-nickel(Cu—Mn—Ni) based alloys, are employable.

For example, employable alloys, which constitute the layer material 2, include from 5% to 30% manganese(Mn), from 30% to 50% nickel(Ni), inevitable impurities, and the balance substantially of copper(Cu), by weight, based on the total weight of the second raw material powders.

Still more, the employable alloys can include from 0.01% to 2% Boron(B), and from 0.01% to 4% of silicon(Si). Besides, B or Si can be omitted in these alloys depending on uses.

The restricted reason for the composition of the above-mentioned alloys will be hereinafter described. Copper(Cu) contributes to improve seizure-resistance with respect to a mating member (material: Fe alloys). Manganese (Mn) contributes to decrease the solidus temperature and to prevent corrosion with respect to the base material 1. Nickel (Ni) contributes to improve corrosion-resistance in environment, to increase the solidus temperature, and to regulate a frictional-coefficient. Boron(B) and silicon(Si) contribute to decrease the solidus temperature and to improve wettability with respect to a ferrous component included in the base material 1.

In the case where the layer material 2 constitutes either gathering powders or a green compact composed by pressing the gathering powders, particle-size of the powders of the layer material 2 can be set, for example, in the neighborhood of from 10 to 200 micrometers. The finer the particle-size is, the better the composition-uniformity of the layer material 2 becomes.

Figure 15:
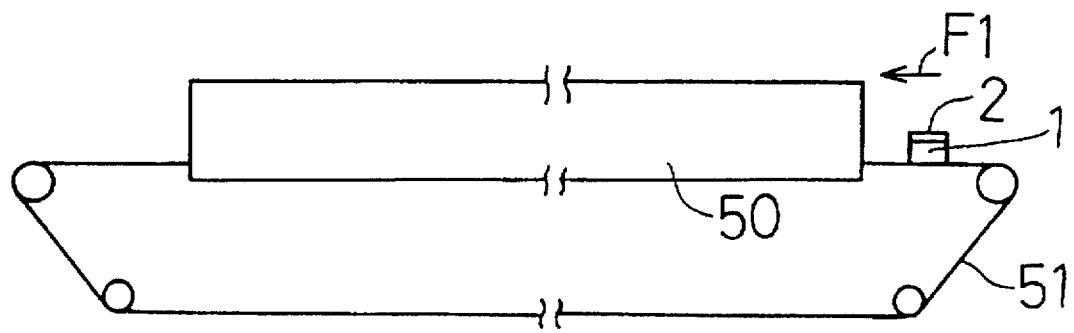
FIG. 15 is a construction view which schematically illustrates a condition for sintering by a continuously sintering furnace.

FIG. 15 shows a continuously sintering configuration using a continuously sintering furnace 50. In the sintering, a conveyor 51 putting the base material 1 drives in a direction of arrow "F1", thus the base material 1 is continuously sintered in the continuously sintering furnace 50.

As mentioned above, according to each of embodiments, since the solidus temperature of the molten liquid increases with the reaction proceeding, the occurred molten liquid can solidify early without cooling the layer material 2. In this way, since the molten liquid can solidify without the positive cooling-treatment, the base material 1 can advantageously be sintered in the continuously sintering furnace 50.

On the other hand, in the above mentioned conventional technique disclosed in Japanese Unexamined Patent Publication No.61-96010, namely, in the system demanding the positive cooling-treatment of temperature, it is not available to employ a continuously sintering furnace which contributes to improve sintering efficiency.

Figure 16:
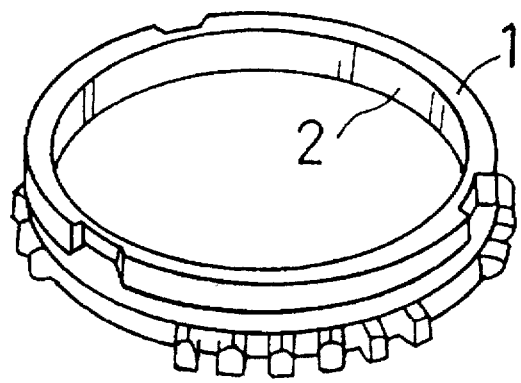
FIG. 16 is a perspective view which schematically illustrates a synchronizer-ring.

FIG. 16 shows other embodiment of the present invention, in which a synchronizer-ring is employed being a constituent element of a synchro-apparatus of a driving mechanism of a vehicle. The synchronizer-ring comprises a ring-shaped base material 1 and a ring-shaped layer material 2 having a thin-thickness. The layer material 2 covers on an inner circumferential surface of the base material 1. And also, the inner circumferential surface of the layer material 2 constitutes a sliding surface for sliding on a mating member. The synchronizer-ring is produced by way of a configuration which is similar to the configuration shown in FIG. 8. The layer material 2 is composed of a copper(Cu) based alloy, for instance, the above described copper-manganese-nickel (Cu—Mn—Ni) based alloy.

Experiment

With respect to sliding member test specimens produced by the process of the First Embodiment, tests were conducted by the following method. These tests employ first raw material powders, which is composed of a mixture mixing 0.5% of graphite powders, 0.8% of zinc stearate as a lubricant, and the balance substantially of iron-based alloy powders (particle size: from 20 to 250 micrometers) by weight. The iron-based alloy powders include 4% of nickel (Ni), 1.5% of copper(Cu), and 0.5% of molybdenum (Mo), inevitable impurities, and the balance substantially of iron.

These tests employ second raw material powders, which is composed of a mixture mixing copper(Cu)-based powders (particle size: from 50 to 300 micrometers) with pure iron powders (particle size: from 20 to 250 micrometers). Based on the total weight of the mixture, the pure iron powders was 20% by weight.

The composition of the copper (Cu)-based powders was copper-manganese-nickel (Cu—Mn—Ni) based alloy, in detail, 40% of nickel (Ni), and 20% of manganese (Mn), 2% of silicon (Si), 1% of boron (B), inevitable impurities, and the balance substantially of copper (Cu).

With respect to the sintering condition for the base material 1 in these tests, the base material 1 was heated to 700 degrees centigrade at a predetermined heating speed in a nitrogen atmosphere. Next, the base material 1 was kept at the heated temperature. After that, the base material 1 was kept at a temperature of 1120 degrees centigrade for 30 minutes. Next, the base material 1 was cooled.

With respect to the sliding member test specimens produced by the process of the First embodiment, a seizure test and an abrasion test were carried out as sliding tests.

Also, with respect of the test specimens of a comparable example, the seizure test and the abrasion test were carried out similarly. The specimens of the comparable example is composed of a copper(Cu) based alloy (bulky casting articles ) which is employed conventionally in the synchronizer-ring.

The copper (Cu) based alloy of the comparable example includes 4.8% of Al, 2.5% of Ni, 1.6% of Ti, and 30% of Zn by weight.

Considering the synchronizer-ring, conditions of the seizure test were as follows: A mating member was ferrous carburization material (JIS SCM420), sliding speed is set to be at 7 m/s, and the seizure load of the specimens was investigated in gear-oil. As for a seizure limit load, the sliding member test specimens of the First preferred embodiment exhibited 213 kg on average, and the sliding member test specimens of the comparable example exhibited 200 kg on average.

Conditions of the abrasion test was as follows: A mating member was ferrous carburization material (JIS SCM420), sliding speed is set to be 5 m/s, and the specimens were slidden in gear-oil under a load of 27.2 kg for 30 minutes.

The abrasion amount and the frictional coefficient were investigated. As for the abrasion amount, the sliding member test specimens of the First preferred embodiment exhibited 12.2 micrometers on average, and the sliding member test specimens of the comparable example exhibited 32.3 micrometers on average.

As for the frictional coefficient, the sliding member test specimens of the First preferred embodiment exhibited 0.081 on average, and the sliding member test specimens of the comparable example exhibited 0.084 on average.

As understood from test results, according to the First Preferred Embodiment, it can be seen that seizure-resistance and abrasion-resistance are superior to those of the conventional copper (Cu) based alloy of the comparable example. Also, it can be seen that the frictional coefficient being required as a synchronizer-ring corresponds to that of the conventional copper (Cu) based alloy.

According to the sliding member test specimens produced by the First Preferred Embodiment, in spite of the fact that the layer material 2 is composed of copper-manganese-nickel (Cu—Mn—Ni) alloy including a high nickel (Ni) content, the layer material 2 can save a consumptive amount of the Cu—Mn—Ni alloy. Therefore, the First Preferred embodiment is advantageous in the reduction of cost as compared with the sliding member of the comparable example.

Figure 17:
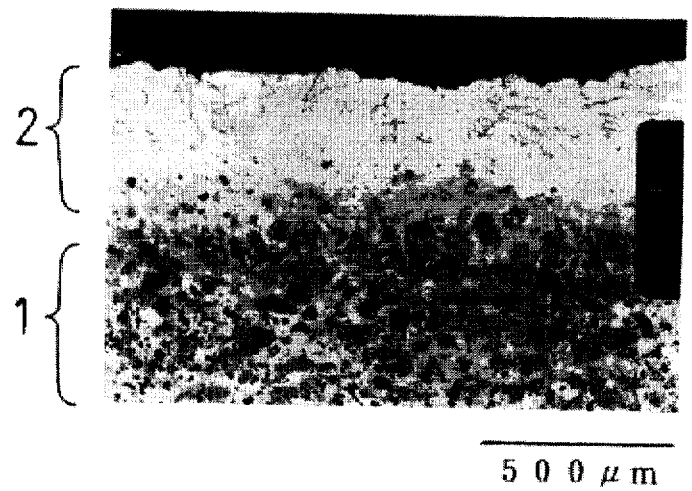
FIG. 17 is a micro-photograph which shows a metallic structure disposed at a boundary between a base material and a layer material of the First Preferred Embodiment according to the present invention.
Figure 18:
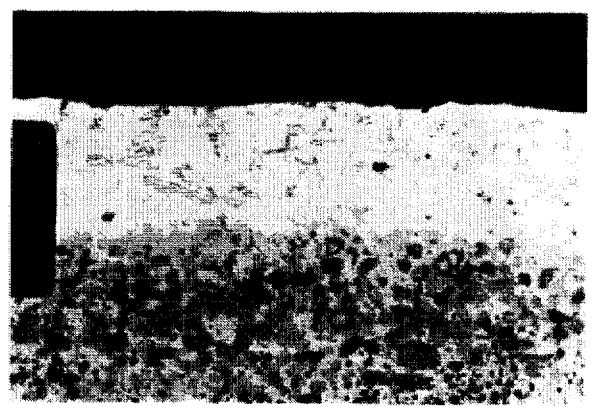
FIG. 18 is a micro-photograph which shows a metallic structure disposed at a boundary between a base material and a layer material of the Third Preferred Embodiment according to the present invention.
Figure 19:
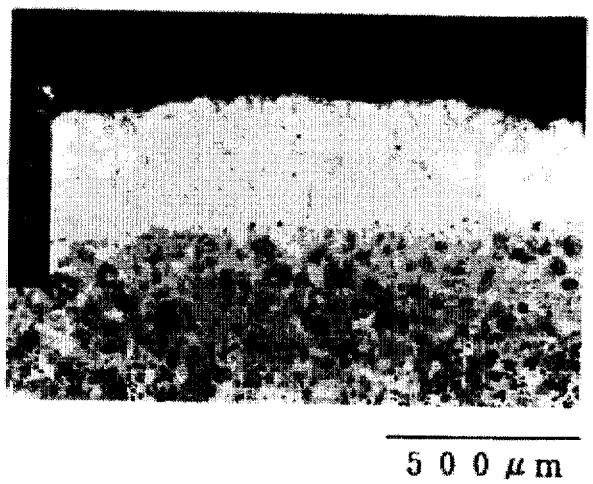
FIG. 19 is a micro-photograph which shows a metallic structure disposed at a boundary between a base material and a layer material of the Fourth Preferred Embodiment according to the present invention.

FIG. 17 shows an optical microphotograph of metallic structure of the test specimen of the First Preferred embodiment. FIG. 18 shows an optical microphotograph of metallic structure of the test specimen of the Third Preferred embodiment shown in FIG. 3. FIG. 19 shows an optical microphotograph of metallic structure of the test specimen of the Fourth Preferred embodiment shown in FIG. 4. Each of the metallic structures was produced on the basis of the above-mentioned composition conditions and sintering conditions. Each of metallic structures was etched with nital.

FIGS. 17 to 19 show the configurations, in which the layer material 2 is piled on the base material 1, the upper black portions in FIGS. 17 to 19 imply the embedded resin in the sample.

As understood from FIG. 17, the layer material 2 infiltrates into minute uneven portions of the covering surface of the base material 1.

Thus, the following can be guessed: After the molten liquid occurs once, the molten liquid infiltrates into the boundary between the base material 1 and the layer material 2, so that the molten liquid solidifies early, thereby metallurgical bonding is accomplished.

According to each of the optical microphotographs, it was confirmed that needle-like fine hard particles are dispersed in the layer material 2 bonded with the base material 1 by sintering.

The hard particles were Fe-boride according to an EPMA analysis apparatus and a X-ray analysis apparatus. Hardness of Fe-boride was in the vicinity of Hv 1800 to 2200, especially in the vicinity of Hv 2000. And also, the size of the hard particles was in the vicinity of 30 to 100 micrometers on average.

Despite of unclearness of the optical microphotographs, according to a scanning electron microscope apparatus and the EPMA analysis apparatus, complex hard phases, having Ni and Mn, were dispersed in the layer material 2 which has already bonded to the base material 1 by sintering. As for the complex hard phases, having net-shaped micro-structure, the hardness was in the vicinity of Hv 800 to 1200, especially in the vicinity of Hv 1000.

Since the hard particles and the hard phases are dispersed in the layer material 2 which has already bonded to the base material 1 by the sintering, abrasion-resistance can be improved in the layer material 2. Therefore, the exposed surface of the layer material 2 after sintering is suitable for a sliding surface.

FIG. 18 shows the optical microphotograph of the metallic structure of the embodiment shown in FIG. 3, where the molten liquid is pressed to the bottom surface of the tray 3 by the weight of the base material 1. As understood from FIG. 18, the surface-flatness of the layer material 2 can be improved.

Equilibrium Diagrams

Figure 20A:
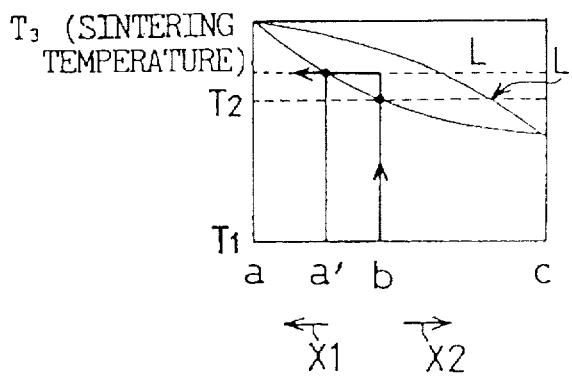
FIGS. 20(A) to (F) show each of equilibrium diagrams which illustrate conditions having a property increasing the solidus temperature.

FIGS. 20(A) to 20(F) show equilibrium diagrams in which the process of the present invention is applicable. In FIG. 20(A), as described above, the composition of the base material 1 is indicated as "a", and the composition of the layer material 2 is indicated as "b". The second raw material powders, constituting the layer material 2, are the mixture composed by mixing the copper(Cu)-based powders with the pure iron powders. On condition that only the copper (Cu) based powders are employed, the composition is merely indicated as "c" in FIG. 20(A). In order that the composition of "c" may reach the composition of "a'" and the solid temperature may increase, the reaction with diffusion must proceed considerably; so the reaction to reach the composition of "a'" demands long time.

Owing to the fact that the reaction time is long and the increasing of the solidus temperature demands long time, the sealing in the surface of the base material 1 delays. Thus, all the molten liquid might come to infiltrate into the pores of the base material 1. In this case, the dimensional precision is easy to deteriorate and the base material 1 is easy to be deformed. Additionally, the layer material 2 comes to disappear and does not remain on the base material 1 due to over-infiltration. Thus, there arises a problem that the layer material can not form a sliding layer.

On the other hand, in the case where raw material powders are composed of the mixture formed by mixing the Cu based powders with pure iron powders, the composition of the layer material 2 is not set at "c" but is set at "b" which has rich-Fe. Therefore, the diffusion time to reach the composition of "a'" from the composition of "b", namely, the reaction time can shorten. So, the solidus temperature can increase early, the sealing of the pores can be accomplished early and advantageously.

The process of the present invention is applicable to the following alloys:

Configurations of the equilibrium diagram shown in FIG. 20(A): Ni—Cu alloys, Pt—Au alloys.

Figure 20B:
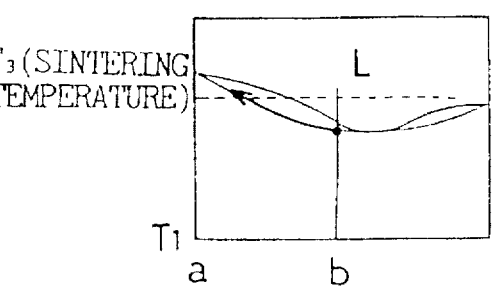

Configurations of the equilibrium diagram shown in FIG. 20(B): Mn—Cu alloys, Zr—Ti alloys, and Nb—Zr alloys.

Figure 20C:
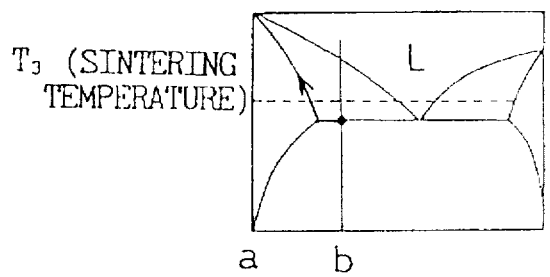

Configurations of the equilibrium diagram shown in FIG. 20(C): Pb—Sn alloys, and Ag—Cu alloys.

Figure 20D:
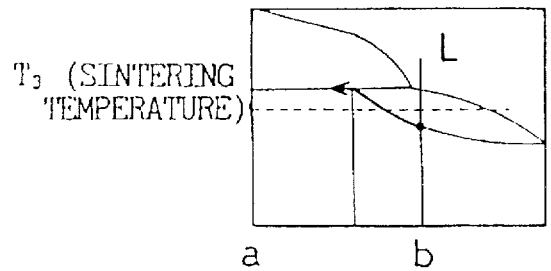

Configurations of the equilibrium diagram shown in FIG. 20(D): Ti—Al alloys, Cu—Zn alloys, Pt—Ag alloys, and Ag—Zn alloys.

Figure 20E:
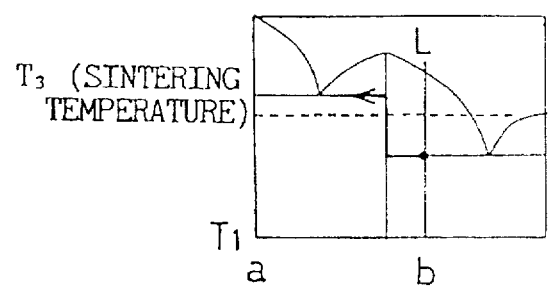

Configurations of the equilibrium diagram shown in FIG. 20(E): Mg—Cu alloys, Cr—Zr alloys, and Cr—Si alloys.

Figure 20F:
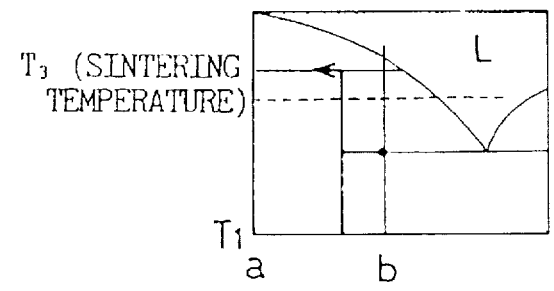

Configurations of the equilibrium diagram shown in FIG. 20(F): Nb—Cu alloys, Ni—Mg alloys, and Au—Pb alloys.

Also in FIGS. 20(A) to 20(F), the composition of the base material 1 is indicated as "a", and the composition of the layer material 2 is indicated as "b". Providing that the molten liquid occurs from the layer material 2 by heating, the molten liquid reacts with the base material 1, and the concentration goes in the direction of the arrow "X1". So, the solid temperature increases in the arrow-direction described in each of equilibrium diagrams shown in FIGS. 20(A) to 20(F).

Modified Versions

In the aforementioned preferred embodiments, the base material 1 has the pores in the covering surface thereof. To put it concretely, the base material 1 is made up of a green compact having pores. In the aforementioned preferred embodiments, the base material 2 made up of the green compact is to be heated for sintering, and the molten liquid occurs by heating.

However, instead of the green compact, a sintered body or a pre-sintered body can be employed as the base material 1. In the case of the pre-sintered body, the above-mentioned sintering temperature corresponds to essential sintering temperature.

According to the process of the present invention having the main aim that the molten liquid flows downward, cast articles, forged articles and pressed articles can be employed as the base material 1, instead of the green compact, the sintered body and the pre-sintered body.

In the aforementioned preferred embodiments, the gathering powders and the green compact are employed. Instead of them, thin sheets such as rolled-sheets, bulky articles produced by casting or forging, can be employed.

What is claimed is:

1. A process for producing a sliding member employing:
   a base material having a covering surface and pores formed at least in said covering surface, and a layer material comprising a constitutive component which undergoes a reaction with a constitutive component of said base material when contacted with said base material, said constitutive component of said layer material being capable of forming a molten liquid whose solidus temperature increases as said reaction proceeds;
   the process comprising the steps of:
      a contacting step of bringing said layer material into contact with at least part of said covering surface of said base material, and
      a heating step of heating said base material and said layer material, while in contact with each other, to a temperature at which said molten liquid is formed, reacting said constitutive component of said base material with said constitutive component of said layer material to form said molten liquid whose solidus temperature increases as the reaction proceeds, infiltrating said molten liquid into said pores of said covering surface of said base material, and solidifying the infiltrated molten liquid so as to thereby seal said pores in said covering surface of said base material, while leaving layer material remaining on the surface of said base material to solidify and constitute a sliding surface on said sliding member.

2. A process for producing a sliding member according to claim 1, wherein said base material in said contacting step is made of one element selected from the group consisting of green compacts, pre-sintered bodies and sintered bodies.

3. A process for producing a sliding member according to claim 1, wherein said layer material in said contacting step is made of one element selected from the group consisting of gathering powders and green compacts made by pressing powders.

4. A process for producing a sliding member according to claim 3, wherein particle-size of said powders is in the range of from 10 to 200 micrometers, and a density ratio of said base material is more than 80%.

5. A process for producing a sliding member according to claim 1, wherein said covering surface is an upper surface of said base material, and said contacting step is carried out by putting said layer material on said covering surface of said base material.

6. A process for producing a sliding member according to claim 1, wherein said covering surface is an under surface of said base material in said contacting step, employing a putting member for putting said layer material, said contacting step is carried out by putting said layer material on said putting member in order that said layer material is disposed between said putting member and said covering surface of said base material, wherein weight of said base material affects said molten liquid occurring at the boundary between said base material and said layer material in said heating step.

7. A process for producing a sliding member according to claim 1, wherein during the process steps said covering surface of said base material is arranged so as to extend in a substantially horizontal direction.

8. A process for producing a sliding member according to claim 1, wherein during the process steps said covering surface of said base material is arranged so as to extend in a substantially vertical direction.

9. A process for producing a sliding member according to claim 1, wherein said base material and said layer material in said contacting step constitute a two-layer constructional green compact being in a body.

10. A process for producing a sliding member according to claim 1, wherein said layer material has a ring shape, said base material has either a ring shape or a cone shape, and said layer material is piled up on said covering surface of said base material for bringing said layer material into contact with at least said part of said covering surface of said base material in said contacting step.

11. A process for producing a sliding member according to claim 1, wherein said base material and said layer material in said contacting step constitute a two-layer constructional green compact which has a ring-shape being in a body for constituting a synchronizer-ring and which is made by pressing first raw material powders and second raw material powders overlapping with said first raw material powders.

12. A process for producing a sliding member according to claim 1, wherein said base material is composed of iron based alloy, and said layer material is composed of copper based alloy.

13. A process for producing a sliding member according to claim 1, wherein said base material is composed of iron-nickel-copper (Fe—Ni—Cu) based alloy.

14. A process for producing a sliding member according to claim 1, wherein said layer material includes from 5% to 30% manganese(Mn), from 30% to 50% nickel(Ni), inevitable impurities, and the balance substantially of copper(Cu) by weight, based on the total weight of said layer material.

15. A process for producing a sliding member according to claim 1, wherein said layer material after said heating step comprises at least one element selected from the group consisting of hard particles and hard phases.

16. A process for producing a sliding member according to claim 1, wherein said base material and said layer material in said contacting step constitute a two-layer constructional green compact being in a body, said covering surface of said base material extends in a circumferential direction, said covering surface has an engaging portion for engaging with said layer material, and said layer material in said contacting step is engaged with said engaging portion for bringing said layer material into contact with at least said part of said covering surface of said base material.

17. A process for producing a sliding member according to claim 16, wherein said covering surface is an inner circumferential surface having a conical shape whose inner diameter is decreasing as it goes downward, and said layer material in said contacting step is engaged with said inner circumferential surface for bringing said layer material into contact with at least said part of said inner circumferential surface.

18. A process for producing a sliding member according to claim 1, wherein said covering surface has a concave-convex portion for increasing a surface-area thereof.

19. A process for producing a sliding member according to claim 17, wherein said inner circumferential surface of said base material has concave-convex portions which extend nearly vertically along said covering surface and which is disposed at predetermined intervals in a circumferential direction for increasing a surface-area thereof.

20. A process for producing a composite layer member employing:

a base material having a covering surface arranged vertically and pores formed at least in said covering surface, and a layer material comprising a constitutive compound which undergoes a reaction with a constitutive component of aid base material when contacted with said base material, said constitutive component of said layer material being capable of forming a molten liquid whose solidus temperature increases as said reaction proceeds;

the process comprising the steps of:

a contacting step of bringing said layer material into contact with at least part of said covering surface of said base material, and a heating step of heating said base material and said layer material, while in contact with each other, to a temperature at which said molten liquid is formed, reacting said constitutive component of said layer material with said constitutive component of said layer material to form said molten liquid whose solidus temperature increases as the reaction proceeds, so that said molten liquid flows downward along said covering surface of said base material, and solidifying said molten liquid.

21. A process for producing a composite layer member according to claim 20, employing a pressing means having a pressing surface which corresponds to said covering surface of said base material for pressing said molten liquid flowing along said covering surface of said base material, wherein said pressing surface of said pressing means is pressed to said covering surface in order to correct the flowing molten liquid in said heating step.

22. A process for producing a composite layer member according to claim 20, wherein said base material in said contacting step is made of one element selected from the group consisting of green compacts, pre-sintered bodies and sintered bodies.

23. A process for producing a composite layer member according to claim 20, wherein said layer material in said contacting step is made of one element selected from the group consisting of gathering powders and green compacts made by pressing powders.

24. A process for producing a composite layer member according to claim 23, wherein particle-size of said powders is in the range of from 10 to 200 micrometers, and a density ratio of said base material is more than 80%.

25. A process for producing a composite layer member according to claim 20, wherein said covering surface of said base material is arranged along the plumb-line or a direction leaning with respect to the plumb-line.

26. A process for producing a composite layer member according to claim 20, wherein during the process steps said covering surface of said base material is arranged so as to extend in a substantially vertical direction, said base material and said layer material in said contacting step constitute a two-layer constructional green compact being in a body.

27. A process for producing a composite layer member according to claim 20, wherein said layer material has a ring shape, said base material has either a ring shape or a cone shape, and said layer material is piled up on said covering surface of said base material in said contacting step for bringing said layer material into contact with at least said part of said covering surface of said base material.

28. A process for producing a composite layer member according to claim 20, wherein said base material is composed of iron based alloy, and said layer material is composed of copper based alloy.

29. A process for producing a composite layer member according to claim 20, wherein said base material is composed of iron-nickel-copper (Fe—Ni—Cu) based alloy.

30. A process for producing a composite layer member according to claim 20, wherein said layer material includes from 5% to 30% manganese(Mn), from 30% to 50% nickel (Ni), inevitable impurities, and the balance substantially of copper(Cu) by weight, based on the total weight of said layer material.

31. A process for producing a composite layer member according to claim 20, wherein said covering surface of said base material has an engaging portion for engaging with said layer material, and said layer material is engaged with said engaging portion in said contacting step for bringing said layer material into contact with at least said part of said covering surface of said base material.

32. A process for producing a composite layer member according to claim 31, wherein said engaging portion is formed in the vicinity of an upper portion of said covering surface of said base material.

33. A process for producing a composite layer member according to claim 20, wherein said base material has an inner circumferential surface whose inner diameter is decreasing as it goes downward, and said layer material is engaged with said inner circumferential surface in said contacting step for bringing said layer material into contact with at least said part of said covering surface of said base material.

34. A process for producing a composite layer member according to claim 20, wherein said covering surface of said base material has a concave-convex portion for increasing a surface-area thereof, and said molten liquid comes into contact with said concave-convex portion in said heating step.

35. A process for producing a composite layer member according to claim 20, wherein said covering surface of said base material extends in a circumferential direction, and said covering surface of said base material has concave-convex portions extending vertically and disposed at predetermined intervals in said circumferential direction for increasing a surface-area thereof, and said molten liquid comes into contact with said concave-convex portions in said heating step.

* * * * *